United States Patent
Kim et al.

(10) Patent No.: US 12,425,860 B2
(45) Date of Patent: Sep. 23, 2025

(54) APPARATUS AND METHOD FOR PERFORMING REMOTE ATTESTATION BY TAKING INTO ACCOUNT MOBILITY

(71) Applicant: ELECTRONICS AND TELECOMMUNICATIONS RESEARCH INSTITUTE, Daejeon (KR)

(72) Inventors: Kyeong Tae Kim, Daejeon (KR); Young Ho Kim, Daejeon (KR); Jeong Nyeo Kim, Daejeon (KR); Seon Gyoung Sohn, Daejeon (KR); Yun Kyung Lee, Daejeon (KR); Jae Deok Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 254 days.

(21) Appl. No.: 18/118,202

(22) Filed: Mar. 7, 2023

(65) Prior Publication Data
US 2023/0292129 A1    Sep. 14, 2023

(30) Foreign Application Priority Data
Mar. 8, 2022    (KR) .................. 10-2022-0029162

(51) Int. Cl.
*H04W 12/108* (2021.01)
*H04L 9/30* (2006.01)
*H04L 9/32* (2006.01)

(52) U.S. Cl.
CPC ......... *H04W 12/108* (2021.01); *H04L 9/3073* (2013.01); *H04L 9/3213* (2013.01); *H04L 9/3247* (2013.01)

(58) Field of Classification Search
None
See application file for complete search history.

(56) References Cited

U.S. PATENT DOCUMENTS

| 10,180,842 B2 | 1/2019 | Moon |
| 10,511,488 B2 | 12/2019 | Moon et al. |

(Continued)

FOREIGN PATENT DOCUMENTS

| CN | 110635904 B | * | 7/2020 | |
| CN | 112217775 A | * | 1/2021 | ........... G06F 21/577 |

(Continued)

OTHER PUBLICATIONS

N. Asokan et al., "SEDA: Scalable embedded device attestation", CCS'15, Oct. 12-16, 2015, Denver, Colorado, USA.

(Continued)

*Primary Examiner* — Jeffrey C Pwu
*Assistant Examiner* — Mayasa A. Shaawat
(74) *Attorney, Agent, or Firm* — LRK PATENT LAW FIRM

(57) ABSTRACT

Provided are an apparatus and method for performing remote attestation by taking into account mobility. The method includes obtaining, by each node constituting a network, a remote attestation result value by performing self-remote attestation, obtaining, by each of the nodes, remote attestation result values from the other nodes by broadcasting the obtained remote attestation result value to at least one neighboring node, and monitoring, by each of the nodes, remote attestation of each of the nodes on the basis of the obtained remote attestation result values of the nodes.

17 Claims, 14 Drawing Sheets

(56) References Cited

U.S. PATENT DOCUMENTS

| | | | | |
|---|---|---|---|---|
| 11,343,091 | B2* | 5/2022 | Sheth | H04L 9/3247 |
| 2016/0149708 | A1* | 5/2016 | Garcia Morchon | H04L 9/3247 |
| | | | | 713/176 |
| 2018/0089014 | A1* | 3/2018 | Smith | G06F 11/0751 |
| 2019/0349426 | A1* | 11/2019 | Smith | H04L 9/3239 |
| 2022/0200985 | A1* | 6/2022 | Simon | H04L 63/0853 |

FOREIGN PATENT DOCUMENTS

| | | | | |
|---|---|---|---|---|
| CN | 114070733 A | * | 2/2022 | |
| EP | 3740918 A1 | * | 11/2020 | G06Q 20/06 |
| KR | 10-2017-0122545 A | | 11/2017 | |
| KR | 10-2176115 B1 | | 11/2020 | |
| KR | 10-2205779 B1 | | 1/2021 | |

OTHER PUBLICATIONS

Xavier Carpent et al., "Lightweight Swarm Attestation: A Tale of Two Lisa-s", Asia CCS '17, Apr. 2-6, 2017, Abu Dhabi, United Arab Emirates.

Salvatore Frontera et al, "Bloom Filter based Collective Remote Attestation for Dynamic Networks", ARES 21 (Aug. 31, 2021).

Florian Kohnhauser et al, "A Practical Attestation Protocol for Autonomous Embedded Systems", 2019 IEEE European Symposium on Security and Privacy (Jun. 19, 2019).

* cited by examiner

APPARATUS AND METHOD FOR PERFORMING REMOTE ATTESTATION BY TAKING INTO ACCOUNT MOBILITY

CROSS-REFERENCE TO RELATED APPLICATIONS

This application claims priority to Korean Patent Application No. 10-2022-0029162 filed on Mar. 8, 2022 in the Korean Intellectual Property Office (KIPO), the entire contents of which are hereby incorporated by reference.

BACKGROUND

1. Technical Field

Example embodiments of the present invention relate to a remote attestation apparatus and method, and more specifically, to an apparatus and method for performing remote attestation by taking into account mobility.

2. Description of Related Art

Recently, it was reported that Internet-of-Things (IoT) devices, such as closed circuit television (CCTV) cameras and apartment wall-pads, through which personal information is likely to leak, were attacked by malicious DDoS attacks and thus about 150,000 devices were hacked to become part of a bot and used to attack a French web hosting company.

Such damage may be prevented if statuses, e.g., internal situations, of IoT devices such as CCTV cameras can be periodically monitored to determine whether IoT devices have been infected with malicious code by malicious hackers. Remote attestation is technology for allowing a verifier to determine a confidence level of the system integrity of an IoT device, and employs a protocol in which, when a verifier requests remote attestation, the IoT device generates a attestation result value for an internal status thereof or actions generated in the system using a chain hash function and transmits the attestation result value to the verifier to prove the integrity thereof.

SUMMARY

Accordingly, example embodiments of the present invention are provided to substantially obviate one or more problems due to limitations and disadvantages of the related art.

Example embodiments of the present invention provide an apparatus and method for performing remote attestation by taking into account mobility.

Technical aspects of the present disclosure are not limited to those described above, and other aspects that are not described herein will be clearly understood by those of ordinary skill in the art to which the present disclosure pertains from the following description.

In some example embodiments, an apparatus and method for performing remote attestation by taking into account mobility are provided. According to an embodiment of the present disclosure, a remote attestation method performed by taking into account mobility includes obtaining, by each node constituting a network, a remote attestation result value by performing self-remote attestation, obtaining, by each of the nodes, remote attestation result values from the other nodes by broadcasting the obtained remote attestation result value to at least one neighboring node, and monitoring, by each of the nodes, remote attestation of each of the nodes on the basis of the obtained remote attestation result values of the nodes.

The obtaining of the remote attestation result value by performing the self-remote attestation may include recording the remote attestation result value of each of the nodes in a predetermined network message using a Bloom filter.

The obtaining of the remote attestation result values from the other nodes may include obtaining remote attestation result values of the other nodes by broadcasting the network message to the at least one neighboring node and updating the network message using a preset consensus protocol and a network message received from the at least one neighboring node.

The obtaining of the remote attestation result values from the other nodes may include updating, by each of the nodes, the network message by combining a remote attestation result value recorded in the network message with a remote attestation result value recorded in the received network message.

The consensus protocol may include a symmetric key-based consensus protocol or an asymmetric key-based consensus protocol.

The obtaining of the remote attestation result values from the other nodes may include verifying, by each of the nodes, integrity of each of the nodes using the consensus protocol, updating the network message with a network message of at least one node with verified integrity, and obtaining remote attestation result values of the other nodes through the updated network message.

The verifying of the integrity of each of the nodes may include starting, by the nodes, generation of tokens by generating commitment values, generating the tokens by integrating identifiers and commitment values corresponding to neighboring nodes of the nodes, and verifying integrity of the nodes participating in the generation of the tokens using the tokens.

The verifying of the integrity of the nodes participating in the generation of the tokens may include storing, by nodes participating in the generation of a token among the tokens, signature values corresponding to the nodes in the token, integrating the signature values corresponding to the nodes, and verifying integrity of the nodes participating in the generation of the tokens by verifying the integrated commitment values and the integrated signature values.

The commitment values $R_i$ may be generated to correspond to $R_i = g^{\{r_i\}}$ with respect to a group G with a prime order q, a generator g of the group G, and a secret random number $r_i$.

The signature values $s_i$ may be generated to correspond to $s_i = r_i + cx_i$ with respect to a signature private key $x_i$ among pairs of signature keys, the secret random number $r_i$, and a hash value c, and the hash value c may be generated to correspond to the integrated commitment values and a message requesting an electronic signature.

The verifying of the integrated commitment values and the integrated signature values may include using a common public key obtained by integrating signature public keys among the pairs of signature keys.

In other example embodiments, a remote attestation method performed by taking into account mobility includes performing, by each node constituting a network, self-remote attestation to obtain a remote attestation result value and recording the obtained remote attestation result value in a network message of the node, receiving, by each of the nodes, a network message broadcast from at least one neighboring node, updating by each of the nodes the network message using the received network message and a preset consensus protocol, and monitoring, by each of the nodes, remote attestation of the nodes constituting the network on the basis of a remote attestation result value updated in the network message.

In still other example embodiments, a remote attestation apparatus for performing remote attestation by taking into account mobility includes a self-verifier configured to perform self-remote attestation to obtain a remote attestation result value and record the obtained remote attestation result value in a network message of the self-verifier, a receiver configured to receive a network message broadcast from at least one neighboring node, an updater configured to update the network message using the received network message and a preset consensus protocol, and a monitoring unit configured to monitor remote attestation of nodes constituting a network on the basis of a remote attestation result value updated in the network message.

The above-described brief features of the present disclosure are merely example aspects of the detailed description of the present disclosure and are not intended to limit the scope of the present disclosure.

BRIEF DESCRIPTION OF DRAWINGS

Example embodiments of the present invention will become more apparent by describing in detail example embodiments of the present invention with reference to the accompanying drawings, in which.

DETAILED DESCRIPTION OF EXAMPLE EMBODIMENTS

Figure 1:
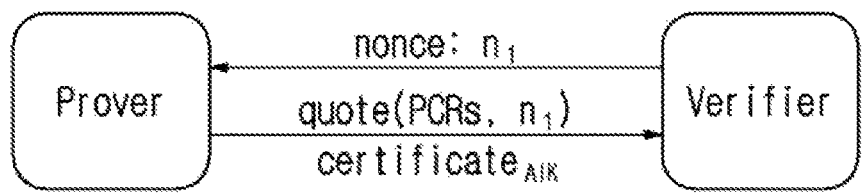
FIG. 1 is a diagram illustrating a trusted platform module (TPM) that performs remote attestation in a trusted execution environment (TEE)

Hereinafter, embodiments of the present disclosure will be described in detail with reference to the accompanying drawings so that the embodiments may be easily implemented by those of ordinary skill in the art. However, the present disclosure may be embodied in many different forms and is not limited to the example embodiments of the present disclosure set forth herein.

In the following description of embodiments of the present disclosure, well-known configurations or functions are not described in detail when it is determined that they would obscure the present disclosure due to unnecessary detail. In the drawings, parts that are not related to description of the present disclosure are omitted and like reference numerals are assigned to like components.

In the present disclosure, it will be understood that when a component is referred to as being "coupled to," "combined with," or "connected to" to another component, the component may be coupled to, combined with or connected to another component directly or indirectly while still another component is interposed therebetween. It will be understood that when a component is referred to as "including" or "having" another element, the presence of other components is not excluded and the element may further include other elements unless described otherwise.

In the present disclosure, terms such as "first" and "second" are used only for the purpose of distinguishing one component from other components and do not limit an order between the components, the importance of the components, or the like unless specifically stated. Therefore, a first component in an embodiment could be termed a second component in another embodiment, and similarly, a second component in an embodiment could be termed a first component in another embodiment without departing from the scope of the present disclosure.

In the present disclosure, it will be understood that components are described as being distinguished from each other only in order to clearly describe features thereof and are not necessarily separated from each other. That is, a plurality of components may be integrated into one hardware or software unit or one component may be distributed in hardware or software units. Thus, it should be understood that embodiments in which components are integrated into one hardware or software unit or one component is distributed in hardware or software units are included in the scope of the present disclosure even if not described separately.

In the present disclosure, it should be understood that components described in various embodiments are not necessarily indispensable components and some may be optional components. Therefore, an embodiment consisting of a subset of components described in an embodiment is included in the scope of the present disclosure. In addition, an embodiment further including other components in addition to components described in various embodiments is also included in the scope of the present disclosure.

In the present disclosure, expressions representing positional relationships, e.g., "top," "bottom," "left," "right," etc., are described for convenience of explanation, and may be interpreted in the opposite way when the drawings are turned upside down.

FIG. 1 is a diagram illustrating a trusted platform module (TPM) that performs remote attestation in a trusted execution environment (TEE).

As shown in FIG. 1, when a verifier requests a nonce value and remote attestation, an Internet-of-Things (IoT) device (prover) transmits a quote, which is generated by the TPM signing a platform configuration register (PCR) value and a nonce value using a secret key (attestation identify key) to the verifier. Upon receiving the quote, the verifier verifies the quote using a certificate to determine the integrity of the IoT device according to a protocol.

In the remote attestation using the TPM, a remote attestation technique is performed by one verifier and one IoT terminal. However, when one verifier performs a remote attestation request/response by a centralized communication method in a multi-hop large-scale network environment, a communication load is generated, and remote attestation cannot be performed particularly when an IoT environment in which a sensing data process is required in real time and resources are limited is considered.

A network should be able to be moved to, joined, withdrawn from, or activated intermittently while a device is participating in remote attestation in the fields of drone application services, smart cities, smart traffic, etc. in which mobility is important. In other words, a specific routing protocol should not be relied on, communication load should be minimized to perform remote attestation in a large-scale IoT network with limited resources, and data should be processed to be light efficiently.

A gist of embodiments of the present disclosure is that each node performs self-remote attestation by taking into account mobility and monitors self-remote attestation result values of other nodes using a consensus protocol between nodes constituting a network.

That is, embodiments of the present disclosure are applicable to atypical networks for which routing is not necessary because a spanning tree need not be built, in which remote attestation may be performed considering mobility sufficiently because a device (prover) need not always be online or need not be connected to during remote attestation for the entirety of the device.

In this case, in embodiments of the present disclosure, a network state may be estimated using a Bloom filter and a consensus protocol instead of accurate information about a state of a device (node). The present disclosure may have the following advantages. First, an efficient data structure for collecting results using the Bloom filter is provided to reduce runtime performance and expand the number of devices when joining or leaving a network. Second, each device (node) is allowed to reach the convergence of a network state snapshot through the collection of remote attestation certificates. Here, the snapshot may be understood as a final network state in which a self-remote attestation result value of each node is collected. In a final attestation result, a verifier can i) easily check whether a damaged device is included in a network by querying devices of the network; ii) estimate the number of damaged devices; and iii) check whether a particular device is damaged.

A method and an apparatus of the present disclosure will be described with reference to FIGS. 2 to 13 below.

Figure 2:
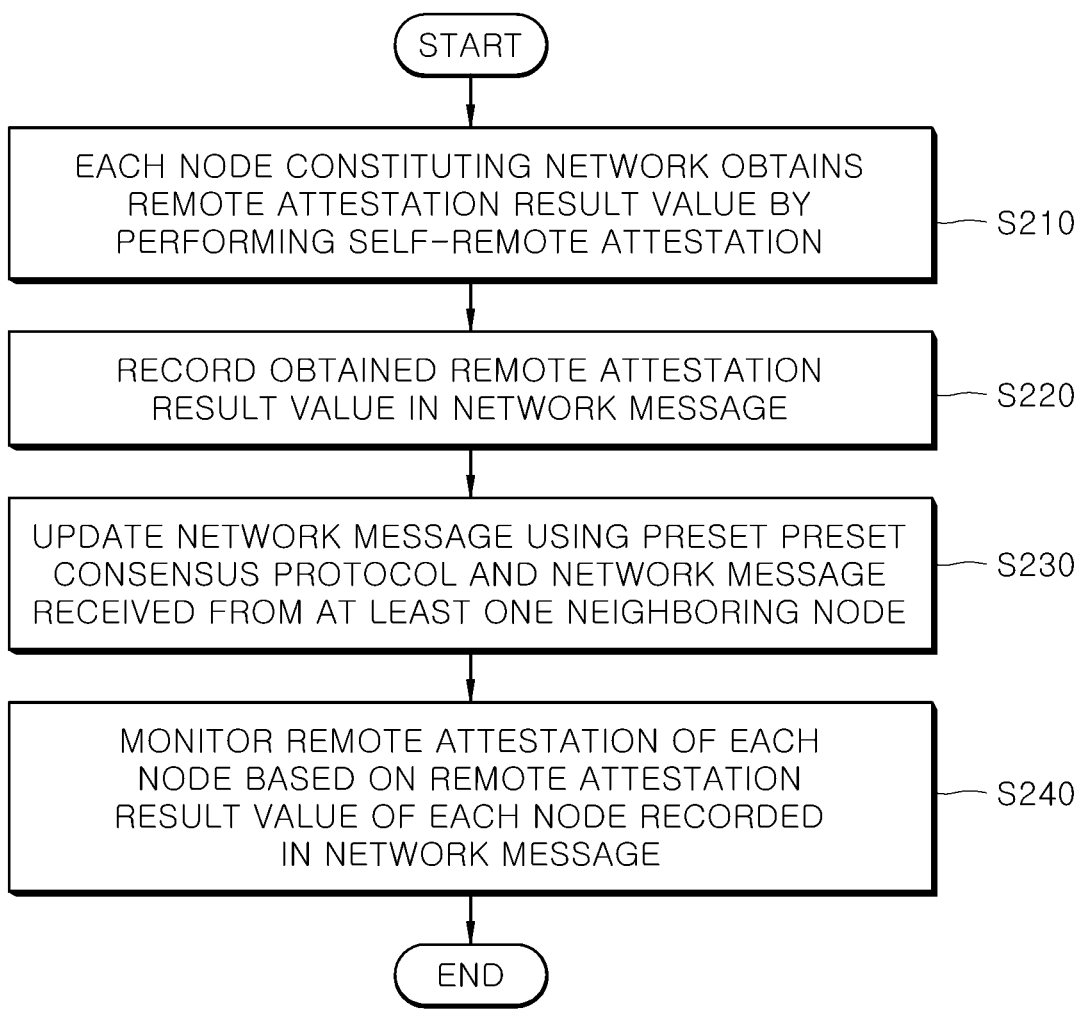
FIG. 2 is a flowchart of a remote attestation method performed by taking into account mobility according to an embodiment of the present disclosure.

FIG. 2 is a flowchart of a remote attestation method performed by taking into account mobility according to an embodiment of the present disclosure.

Referring to FIG. 2, the remote attestation method performed by taking into account mobility according to the embodiment of the present disclosure includes obtaining, by each node constituting a network, a remote attestation result value by performing self-remote attestation and recording the obtained remote attestation result value in a network message (S210 and S220), updating, by each of the nodes, the network message using a preset consensus protocol and a network message received from at least one neighboring node (S230), and monitoring, by each of the nodes, remote attestation of each of the nodes on the basis of remote attestation result values of the nodes recorded in the network message (S240).

Operation S210 is a process of performing self-remote attestation by each of the nodes, in which self-remote attestation may be performed using various methods of performing self-remote attestation, and because these methods are obvious to those of ordinary skill in the art, a detailed description thereof will be omitted here.

In operation S220, a remote attestation result value is recorded in a network message by each node using the Bloom filter.

The Bloom filter will now be described. The Bloom filter is a space-efficient probabilistic data structure designed by Burton Howard Bloom in 1970 and is used to test whether an element is a member of a set. Initially, an empty Bloom filter is a bit array of m bits that are all set to zero. For the Bloom filter, k different hash functions should be defined, and each of the hash functions maps or hashes some set elements to one of m array positions to produce a uniform random distribution. To add an element, the element is inserted into each of the k hash functions to obtain k array positions and a bit for all positions is set to 1. To query an element (to test whether the element is included in a set), the element is transmitted to each of the k hash functions to obtain k array positions. When any of the bits at the k array positions is zero, it is sure that the element is not included in the set and thus all of the bits are set to 1 during insertion. When all of the bits are 1, the element may be included in the set or the bits may be accidentally set to 1 during the insertion of another bit into each of the k hash functions, resulting in false positives. There is no way to distinguish between the two cases by a simple Bloom filter but this problem may be fixed using more advanced technology.

Figure 3:
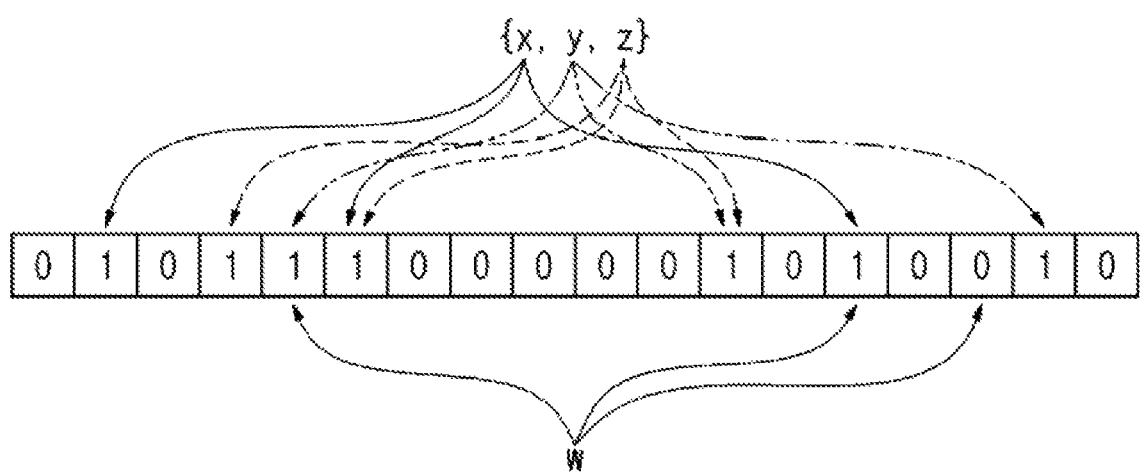
FIG. 3 is a diagram for describing an example of a Bloom filter.

FIG. 3 is a diagram illustrating an example of a bloom filter representing a set {x, y, z} when m=18 and k=3. As shown in FIG. 3, each arrow represents a position of a bit array to which each set element is mapped, and an element w is hashed to a position of a bit array including zero and thus is not included in the set {x, y, z}.

Operation S230 is a process of each of the nodes updating the network message using a consensus protocol. After the integrity of nodes broadcasting received network messages is verified using the consensus protocol, each of the nodes may update the network message by combining the remote attestation result value recorded in the network message and remote attestation result values recorded (or updated) in the network messages of the nodes with verified integrity.

In operation S240, the remote attestation result values of all of the nodes of the network may be monitored through the network messages of the nodes by repeatedly performing operation S230 to update the network messages with the remote attestation result values of the nodes whose integrity is verified. That is, the remote attestation result values of all of the nodes are provided to each of the nodes so that each of the nodes may identify remote attestation results of all of the nodes, and only one node may be queried by a server of the like to check whether there are damaged nodes among all of the nodes of the network, check the number of damaged nodes, identify a damaged device or the like.

The above-described method of the present disclosure will be described with reference to FIGS. 4 to 8 below.

Figure 4:
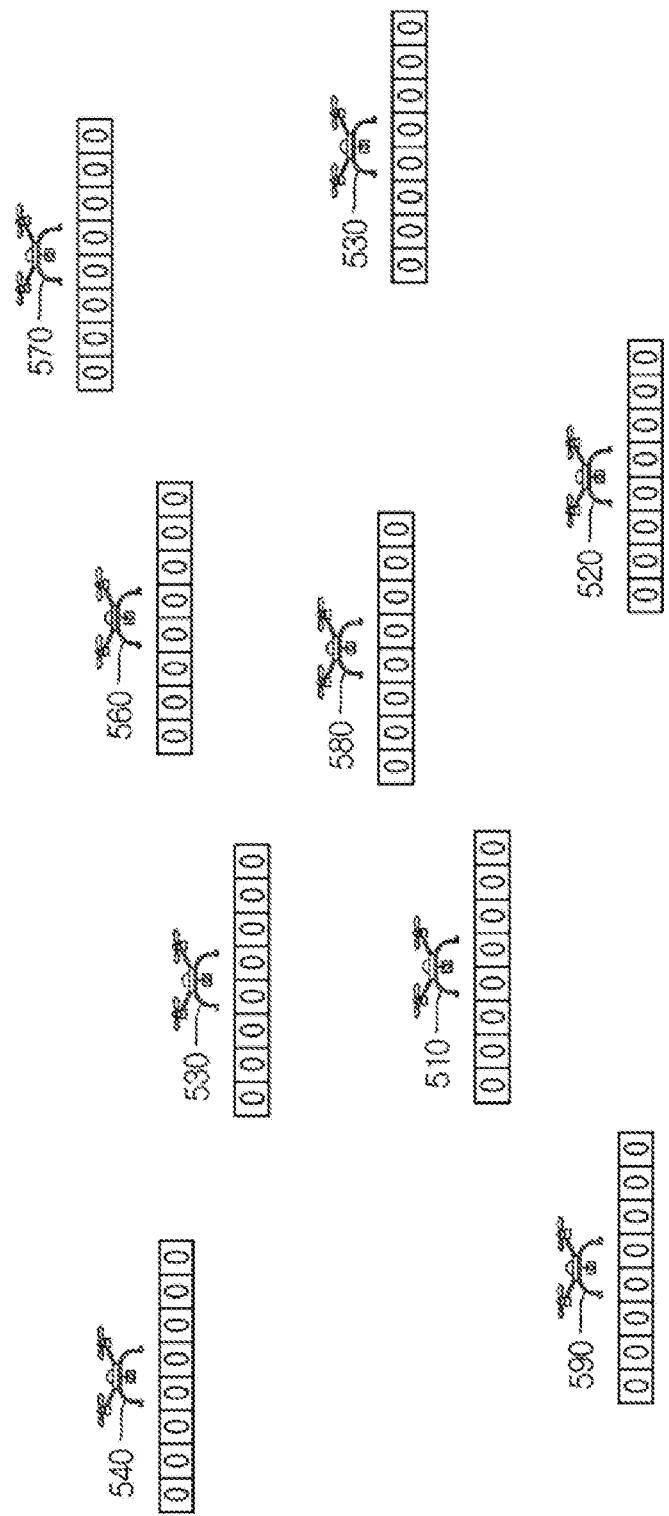
FIG. 4 is a diagram illustrating an example in which the Bloom filter is initialized at each node.
Figure 5:
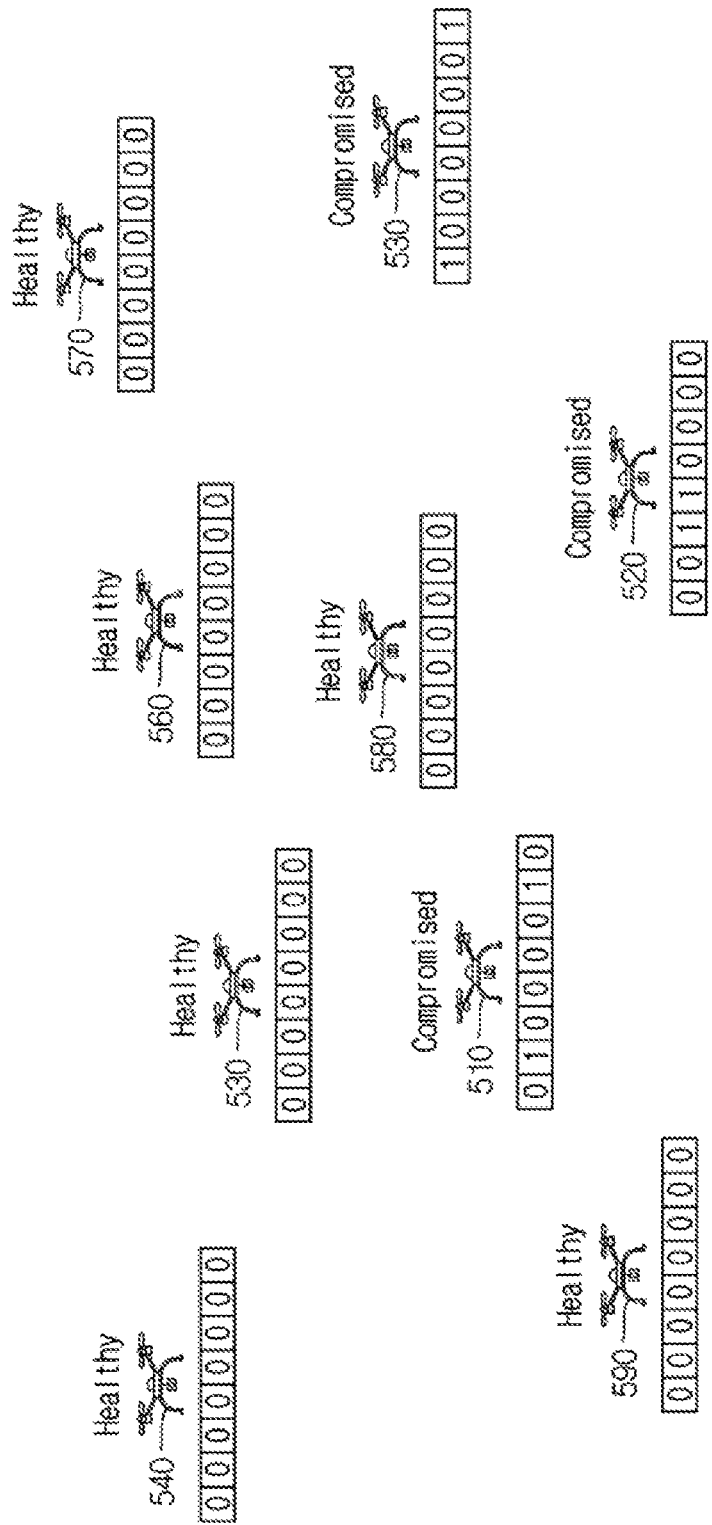
FIG. 5 is a diagram illustrating an example of a result of each node performing self-remote attestation.
Figure 6:
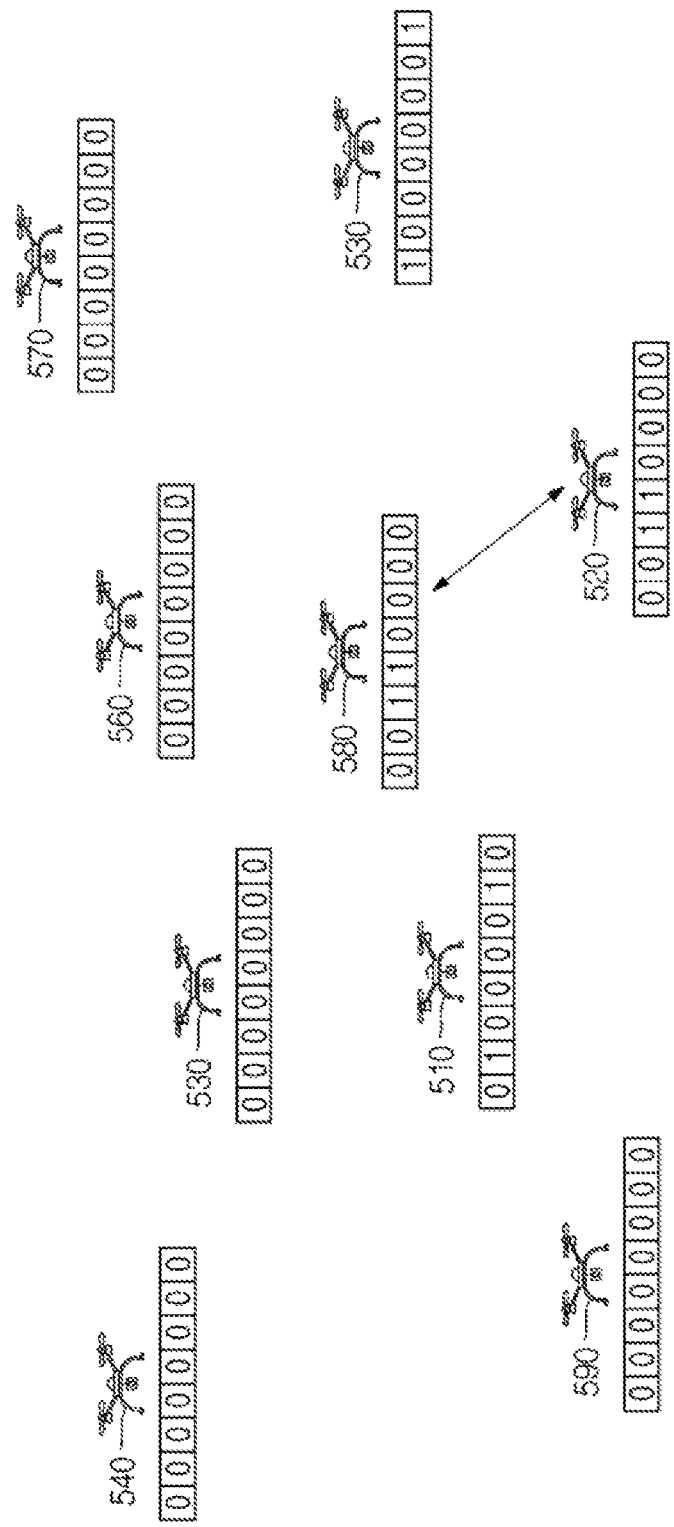
FIGS. 6 and 7 are diagrams illustrating a consensus process between nodes.
Figure 7:
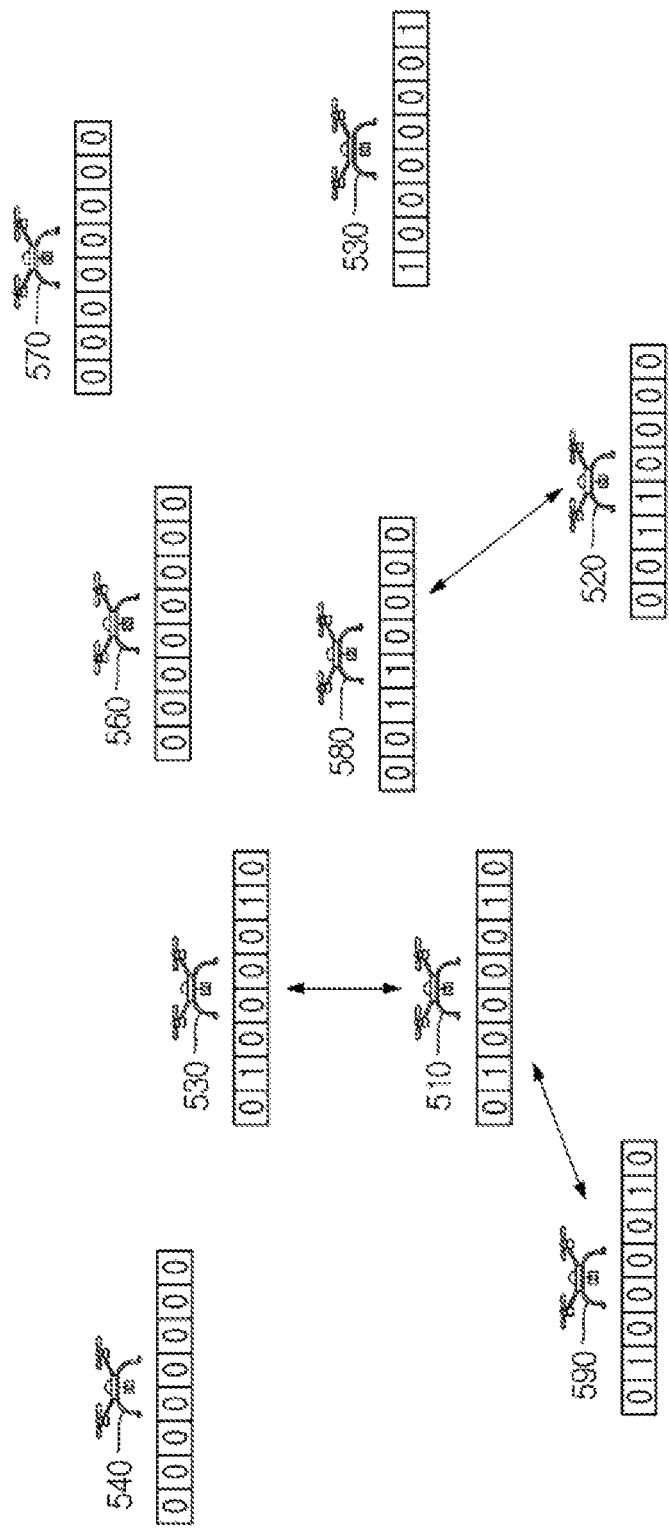
Figure 8:
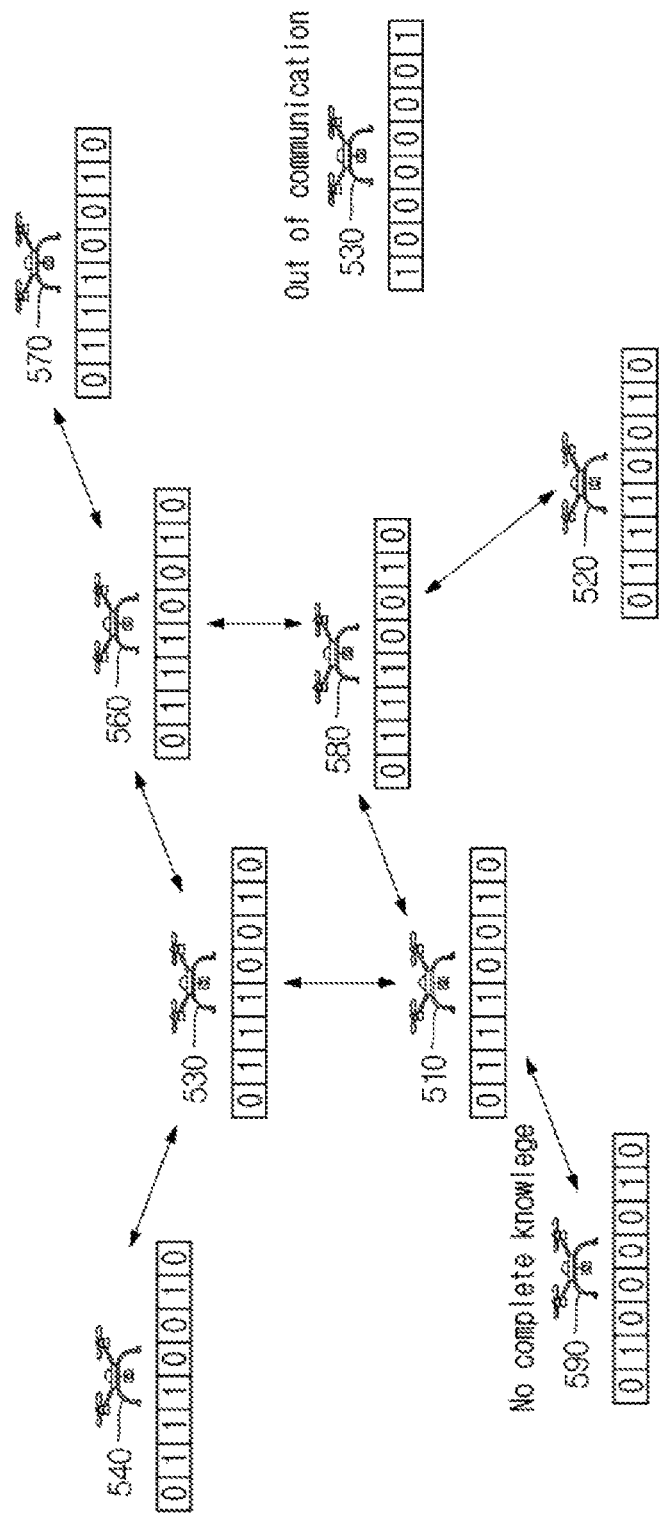
FIG. 8 is a diagram for describing a final network message of each node.

FIG. 4 is a diagram illustrating initialization of a Bloom filter by each node. FIG. 5 is a diagram illustrating an example of a result of each node performing self-remote attestation. FIGS. 6 and 7 are diagrams illustrating a consensus process between nodes. FIG. 8 is a diagram for describing a final network message of each node. Here, FIGS. 4 to 8 are diagrams illustrating examples in which nodes are drone devices, m=8, and k=2.

As shown in FIG. 4, nodes 510 to 590 of a network each initializes a Bloom filter 410 to set the Bloom filter 410 to zero, and as shown in FIG. 5, after the Bloom filter 410 is set to zero, each of the nodes 510 to 590 performs self-remote attestation and records self-remote attestation result values in a network message using the Bloom filter 410. Here, each of the nodes 510 to 590 may perform self-remote attestation using a TPM (HW), a TEE (e.g., OP-TEE or OPEN-TEE), or the like. In this case, each of the nodes 510 to 590 records 0 in a network message when a result of the self-remote attestation shows normal and records 1 in the network message when the result of the self-remote attestation shows compromised (abnormal). In the case of FIG. 5, because three drone devices 510, 520, and 530 are processed as abnormal as a result of self-remote attestation and k=2, each of the three drone devices 510, 520, and 530 sets two fields in a network message to 1 by using a Bloom filter. In addition, remaining drone devices 540 to 590 are processed as normal as a result of self-remote attestation and thus initial states thereof are maintained.

When, as shown in FIG. 5, each of the drone devices 510 to 590 performs self-remote attestation and records a self-remote attestation result value in a network message thereof, e.g., a network snapshot message, using the Bloom filter, each of the drone devices 510 to 590 broadcasts the network snapshot message to at least one neighboring drone device, receives a network snapshot message from the at least one neighboring drone device, and updates the network snapshot message using a predetermined consensus protocol and the network snapshot message received from the at least one neighboring device as shown in FIGS. 6 and 7. For example, in the case of FIG. 6, the drone device 580 receives a network snapshot message, i.e., a network snapshot message including a self-remote attestation result value of the drone device 520 neighboring the drone device 580, which is broadcast from the drone device 520, and updates a network snapshot message thereof using the received network snapshot message and the consensus protocol. In this case, each of the drone devices 510 to 590 may update the network snapshot message by combining a remote attestation result value included in the network snapshot message with a remote attestation result value included in a received network snapshot message through a bitwise OR operation. As another example, in the case of FIG. 7, the drone devices 550 and 590 receive a network snapshot message broadcast from the drone device 510 and update network snapshot messages thereof using the received network snapshot message and the consensus protocol. By each of the nodes (i.e., the drone devices 510 to 590) repeatedly performing the above process, each of the nodes 510 to 590 may record remote attestation result values of all nodes of a network in a network snapshot message thereof and may thus be capable of monitoring remote attestation of the other nodes of the network on the basis of the remote attestation result values recorded in the network snapshot message. FIG. 8 illustrates information recorded in a final network snapshot message for the self-remote attestation result values of FIG. 5. As shown in FIG. 8, the rightmost drone device 530 is out of communication and a self-remote attestation result value thereof is not reflected, and the lower left drone device 590 is within communication but is not updated and thus may update a network message thereof with only information of a partial network snapshot rather than an entire network snapshot. In other words, all drone devices other than the two drone devices 530 and 590 have network snapshot messages including the same remote attestation result value and thus may identify not only remote attestation result values thereof but also remote attestation result values of other drone devices of the network through the network snapshot messages.

In a method according to an embodiment of the present disclosure, each node verifies the integrity of nodes broadcasting a network snapshot message, which is received by each node, using a consensus protocol, and updates a network snapshot message thereof using the network snapshot message of a node whose integrity is verified. A consensus protocol used in the present disclosure, and a process of verifying the integrity of nodes using the consensus protocol will be described below.

The consensus protocol broadcasts a proving result between provers and repeatedly converges on a "snapshot" of a network remote attestation state. A verifier may query all provers in a network to obtain a collective state of the network using the consensus protocol to calculate a dispersion and fault tolerance and resolve the need for an information exchange algorithm. A basic consensus protocol is advantageous in terms of (i) no centralized entity for control of calculation, communication, and time synchronization, (ii) topology that is not fully known to nodes of a network, and (iii) efficient use of limited calculation capability and energy resources.

Among consensus protocols, methods used for remote attestation may be divided into a basic consensus protocol using symmetric keys and a Schnorr multi-signature consensus protocol using asymmetric keys.

In the basic consensus protocol, each node periodically broadcasts information about a state thereof to neighboring nodes connected thereto. Every node updates states of neighboring nodes upon receiving information, and each new node repeatedly performs this process, thus converging on the same consensus on the states of all nodes of a network. A prover performs a self-proving procedure, shares a proving result, and repeatedly converges on a "snapshot" of a network state. A verifier may query all devices in a network to obtain a collective state of the network, and a network state may be represented by a bitmap indicating the number of bits allocated to each device and states with different values (e.g., normal, damaged, or unknown). In the basic consensus protocol, a Bloom filter-based network snapshot message may be updated using the same remote attestation key in all networks.

Figure 10:
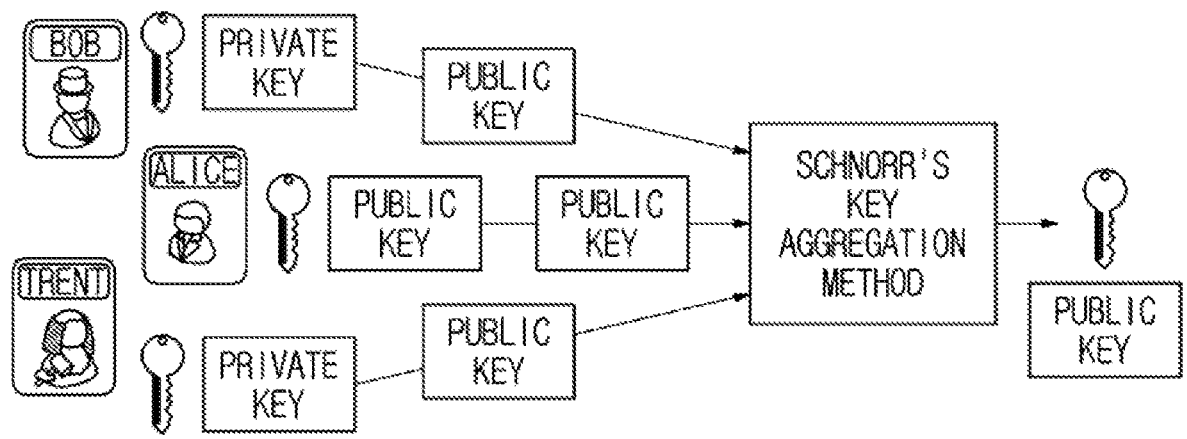
FIG. 10 is a diagram conceptually illustrating generation of a common public key by integrating public keys of individual users by a Schnorr multi-signature method.

As shown in FIG. 10, in the Schnorr multi-signature method, all public keys of individual users may be integrated into a common public key. Accordingly, a signature authenticated by each individual user is decryptable and thus the Schnorr multi-signature method is efficient in terms of reducing a message signature length and computing costs incurred due to signing by several users. All IoT devices periodically generate a token T using a Schnorr multi-signature. Each token is generated together with all devices (nodes) participating in the generation of a token, and used to update the Bloom filter-based network snapshot message. Result values obtained by signing by nodes are integrated and stored in a token and the token is periodically exchanged between the nodes.

Figure 9:
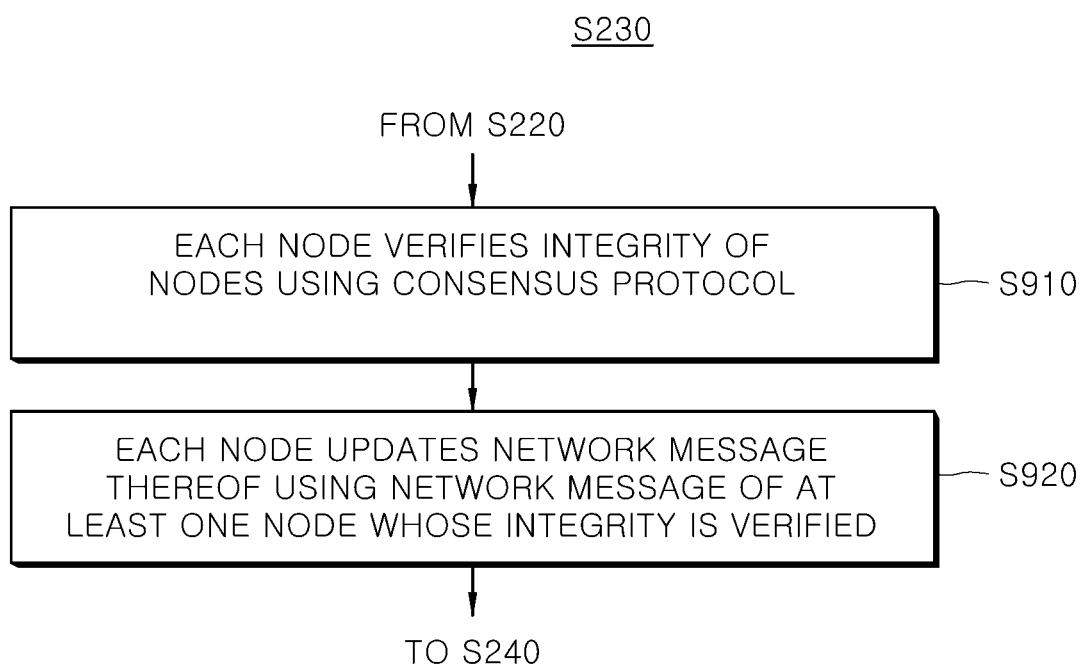
FIG. 9 is a flowchart of an example of operation S230 of FIG. 2.

FIG. 9 is a flowchart of operation S230 of FIG. 2 according to an embodiment, and as shown in FIG. 9, operation S230 includes each node verifying its integrity using a consensus protocol (S910), and each of the nodes updating a network message thereof using a network message of at least one node with verified integrity (S920), wherein each of the nodes may obtain remote attestation result values of the other nodes through the updated network message.

Operation S910 may include nodes starting the generation of tokens by generating commitment values, generating the tokens by integrating identifiers and commitment values corresponding to neighboring nodes of the nodes, and verifying the integrity of the nodes participating in the generation of the tokens using the tokens.

Here, the verifying of the integrity of the nodes participating in the generation of the tokens may include nodes that participate in the generation of a token among the tokens storing signature values corresponding to the nodes in the token, integrating the signature values corresponding to the nodes, and verifying the nodes participating in the generation of the tokens by verifying the integrated commitment values and the integrated signature values. In this case, the commitment values may be generated by the Schnorr multi-signature method.

Specifically, commitment values $R_i$ may be generated by [Equation 1] below.

$$R_i = g^{\{r_i\}} \qquad \text{[Equation 1]}$$

Here, g corresponds to a generator of a group G with a prime order q, and $r_i$ may denote a secret random number. An exponentiation operation is performed by iterating an operation on the group G.

Identifiers ids of generated tokens may include information about nodes participating in the generation of the tokens, and the integrity of the neighboring nodes participating in the generation of the tokens is verified using the generated tokens.

Nodes corresponding to verifiers may transmit a message requesting an electronic signature to the neighboring nodes when the tokens are exchanged between the nodes participating in the generation of the tokens. In this case, the message requesting an electronic signature may further include at least one of identifiers of the tokens, the integrated commitment values of the nodes participating in the generation of the tokens, or token generation time information.

The nodes participating in the generation of the tokens may store signature values corresponding to the nodes, and the signature values may be stored on the basis of the message requesting an electronic signature.

Here, the signature values may be generated on the basis of a signature private key $x_i$ among pairs of signature keys generated in a signing process and corresponding to the nodes, the secret random number $r_i$, and a hash value, and the pairs of signature keys may include signature private keys x and signature public keys X.

A relationship between the signature private key $x_i$ and a signature public key $X_i$ may be expressed by [Equation 2] below.

$$X_i = g^{\{x_i\}} \qquad \text{[Equation 2]}$$

Here, g corresponds to a generator of a group G with a prime order q, and the exponentiation operation is performed by iterating the operation on the group G.

The hash value may be generated to correspond to the integrated commitment values and the message requesting an electronic signature, and signature values $s_i$ may be generated by [Equation 3] below.

$$s_i = r_i + cx_i \qquad \text{[Equation 3]}$$

Here, c may be represented by H(R|m), R=agg($R_1$, $R_2$, . . . ) may denote a value obtained by integrating commitment values of nodes, m may denote a message requesting an electronic signature, and H( ) may denote a hash function.

R and m may be used to generate a signature value, and a function of generating a signature value may be expressed by si=sig(R, m).

Next, the signature values stored in the nodes are integrated and stored. For example, a value obtained by integrating the signature values may be denoted by s, and it may be defined that s=agg($s_1$, $s_2$, . . . ).

Next, the integrated commitment values of the tokens and the integrated signature values are verified. In this case, a common public key obtained by integrating signature public keys among the pairs of signature keys generated during the signing of signature values may be used.

For example, the common public key obtained by integrating the signature public keys may be denoted by X, and it may be defined that X=agg($X_1$, $X_2$, . . . ).

A process of verifying the integrated commitment values of the tokens and the integrated signature values may be expressed by [Equation 4] below.

$$\text{Verify}(R,s) = (g^{\{s\}} ? = RX^{\{c\}}) \qquad \text{[Equation 4]}$$

The verifying of the integrity of the nodes participating in the generation of the tokens may include determining whether the integrity of nodes participating in the generation of a token among the tokens has been verified within a preset time in a time period during which the token was generated. When the integrity of nodes has not been verified within the preset time, the token may be discarded.

Figure 11:
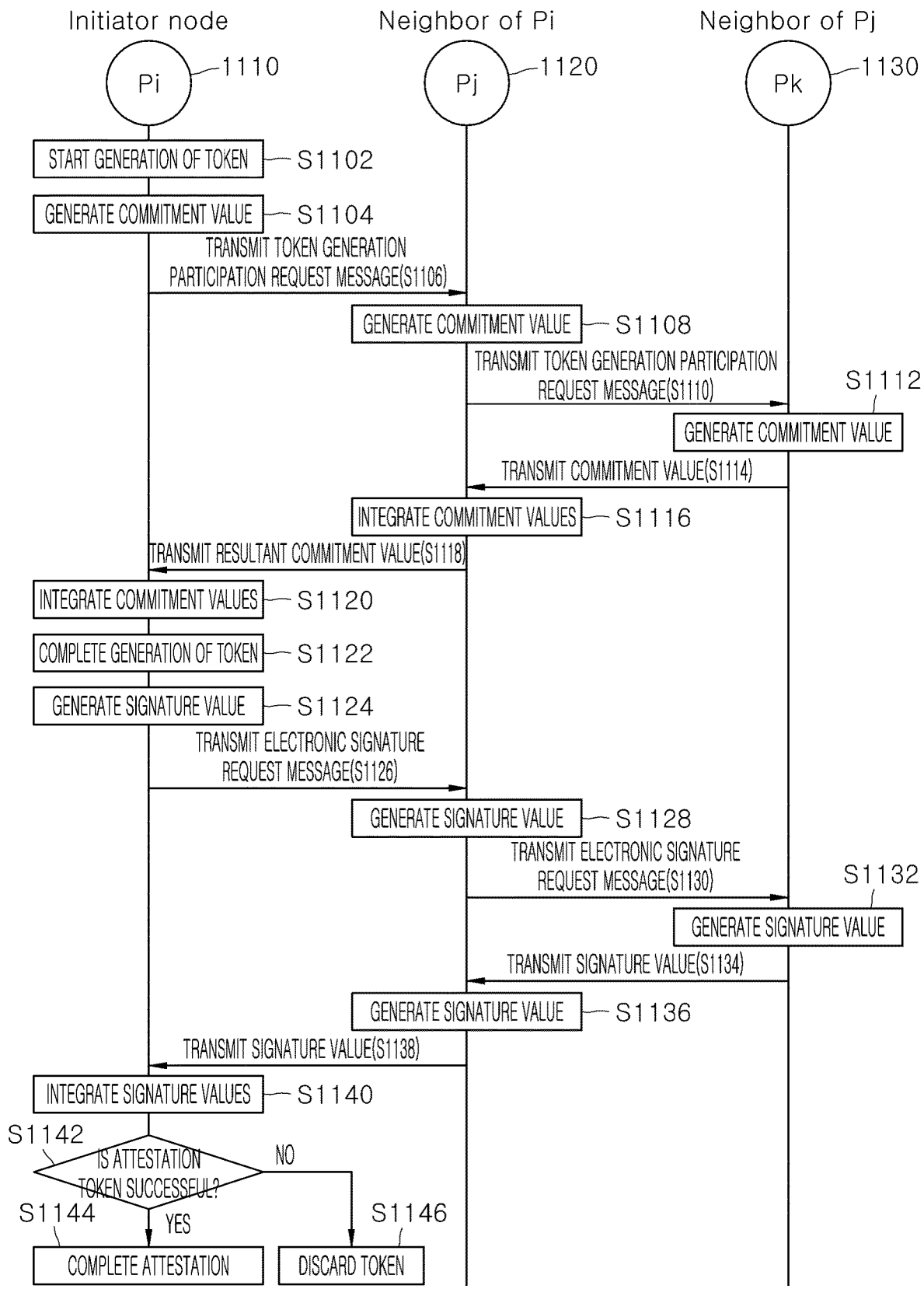
FIG. 11 is a diagram illustrating a process of verifying the integrity of each node.

FIG. 11 is a diagram illustrating a process of verifying the integrity of each node according to an embodiment, in which a token generated by an IoT device is transmitted to a neighboring node and a token is received from a neighboring node to enable all nodes to be a verifier and a participant in a distributed manner instead of a centralized method.

Here, it is assumed that an initiator node 1110 that generates a token in a distributed environment is $P_i$ and participants are divided into neighboring nodes $P_j$ 1120 of the initiator node $P_i$ and neighboring nodes $P_k$ 1130 of the neighboring nodes $P_j$. The initiator node 1110 is a node corresponding to a verifier and is capable of starting the generating of a token. Among nodes participating in the generation of the token, neighboring nodes 1120 may receive a message from the initiator node 1110, transmit the message to the neighboring node 1130, receive a commitment value or a signature value from the neighboring node 1130, integrate a commitment value or a signature value thereof with the received commitment value or signature value, and transmit a result of the integration to the initiator node 1110. The neighboring node 1130 may receive a message from the neighboring node 1120, generate a commitment value or a signature value, and transmit the commitment value or the signature value to the neighboring node 1120.

As shown in FIG. 11, in the process of verifying the integrity of each node, the generation of a token is started by the initiator node 1110 corresponding to a verifier among a plurality of nodes constituting a network (S1102).

In this case, nodes corresponding to verifiers may be selected from among the plurality of nodes constituting the network to correspond to a preset number and a preset period, and the number of nodes corresponding to verifiers and a period thereof may be determined on the basis of the type and size of the network and a configuration of devices constituting the network. In this case, nodes participating in the generation of the token may correspond to nodes located within a preset hop from the node corresponding to the verifier.

The initiator node 1110 may generate a commitment value (S1104) and transmit a token generation participation request message to the neighboring node 1120 (S1106). In this case, the commitment value may be generated by the Schnorr multi-signature method.

The neighboring node 1120 to which the token generation participation request message is transmitted generates a commitment value (S1108). In this case, the token generation participation request message may include an identifier of the token, and the identifier may include information about the nodes participating in the generation of the token. The process of verifying the integrity of each node may further include the neighboring node 1120 updating the identifier of the token to include information about neighboring nodes.

The neighboring node 1120 transmits the token generation participation request message received from the initiator node 1110 to the neighboring nodes 1130 (S1110). The neighboring nodes 1130 receiving this message generate a commitment value corresponding to each node (S1112) and transmit the commitment value to the neighboring node 1120 (S1114).

The neighboring node 1120 receiving the commitment value from the neighboring node 1130 integrates a commitment value thereof and the received commitment value to obtain a resultant commitment value (S1116), and transmits the resultant commitment value to the initiator node 1110 (S1118).

The initiator node 1110 having received the resultant commitment value from the neighboring node 1120 integrates a commitment value thereof and the resultant commitment value (S1120), and completes the generation of the token (S1122).

Consequently, at the time of the completion of the generation of the token, an identifier of the token may include information about the nodes 1110, 1120, and 1130 that have participated in the generation of the token. Likewise, the resultant commitment value is a value obtained by integrating the commitment values of the nodes 1110, 1120, and 1130 that participate in the generation of the token.

The initiator node 1110 generates an electronic signature value for the token (S1124) and transmits a message requesting an electronic signature to the neighboring node 1120 (S1126). In this case, the message requesting an electronic signature may further include at least one of an identifier of the token, the integrated commitment values of the nodes participating in the generation of the token, or token generation time information.

The neighboring node 1120 receiving the message requesting an electronic signature may generate a signature value (S1128) and transmit the message requesting an electronic signature to the neighboring node 1130 (S1130).

The neighboring node 1130 generates a signature value on the basis of the message requesting an electronic signature (S1132), and transmits the generated signature value to the neighboring node 1120 (S1134). In this case, the signature values may be generated on the basis of a private key among pairs of signature keys generated in a signing process and corresponding to the nodes, a secret random number, and a hash value, and the pairs of signature keys may include signature private keys and signature public keys.

The neighboring node 1120 integrates a signature value thereof and the signature value transmitted thereto (S1136), and transmits a resultant signature value to the initiator node 1110 (S1138). The initiator node 1110 integrates a signature value thereof and the resultant signature value transmitted from the neighboring node 1120 to obtain a resultant signature value (S1140).

The initiator node 1110 verifies the resultant commitment value and the resultant signature value (S1142). In this case, in operation S1142, the token may be verified using a common public key obtained by integrating signature public keys among pairs of signature keys generated during the storing of the signature values.

When the attestation of the token succeeds, the attestation ends and the nodes participating in the generation of the token are determined to be in a safe state (S1144). When the attestation of the token fails, the token is discarded (S1146).

The verifying of the integrity of the neighboring nodes participating in the generation of the token (S1142) may include determining whether the integrity of the nodes participating in the generation of the token has been verified within a preset time in a time period during which the token was generated. When the integrity of nodes has not been verified within the preset time, the token may be discarded.

Through the above process, each node may verify the integrity of neighboring nodes broadcasting network snapshot messages, and update a network snapshot message thereof using the network snapshot messages of neighboring nodes whose integrity is verified. That is, participants that share all tokens verify a received token. For each of the tokens, a signature value obtained by integrating individual signature values of the participants may be verified and a Bloom filter-based network snapshot message may be updated with a result value of the attestation.

Figure 12:
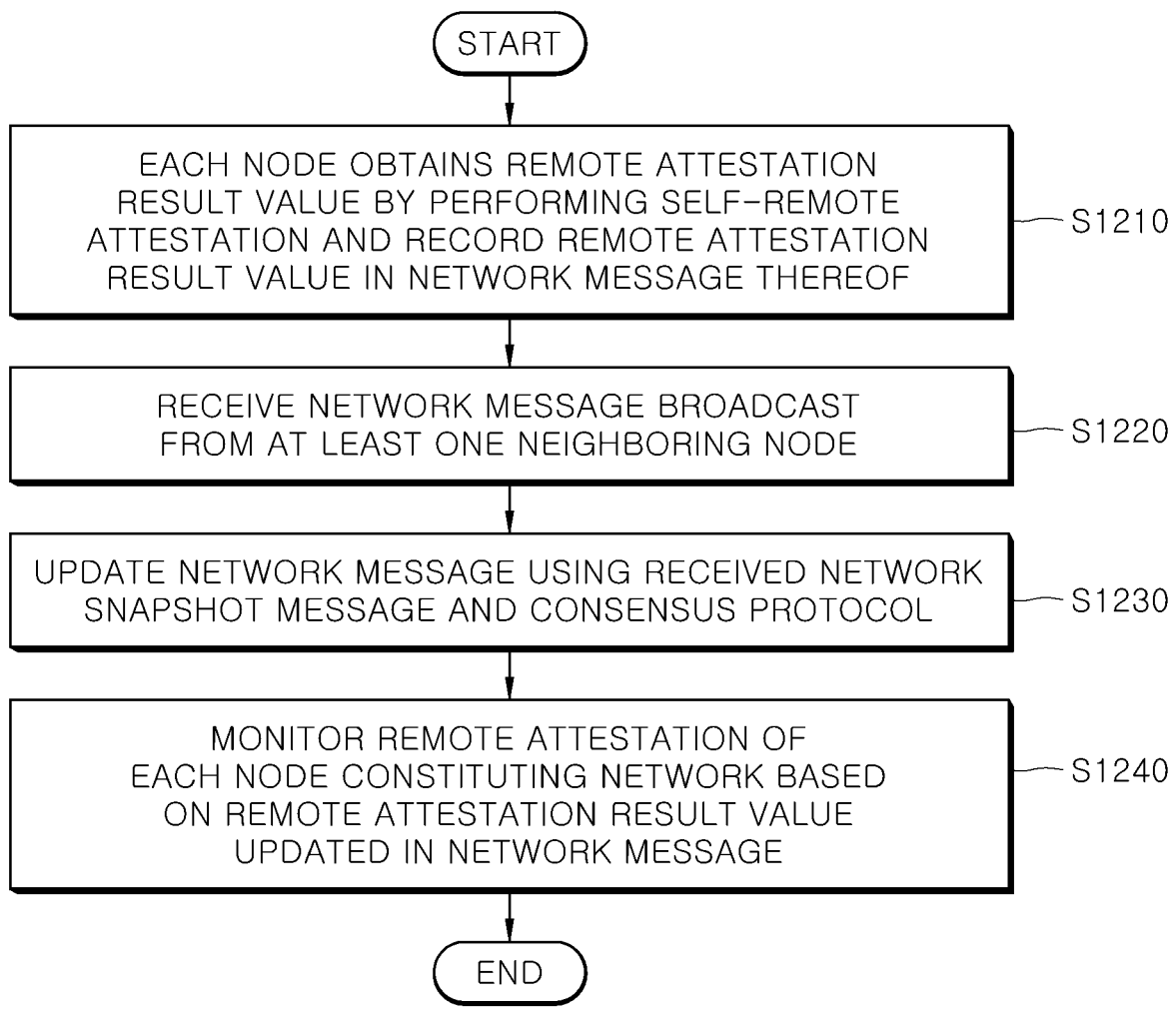
FIG. 12 is a flowchart of a remote attestation method performed by taking into account mobility according to another embodiment of the present disclosure.

FIG. 12 is a flowchart of a remote attestation method performed by taking into account mobility according to another embodiment of the present disclosure, in which the remote attestation method is performed by each node constituting a network.

Referring to FIG. 12, in the remote attestation method performed by taking into account mobility according to another embodiment of the present disclosure, each node obtains a remote attestation result value by performing self-remote attestation, and records the remote attestation result value in a network message thereof (S1210).

Here, in operation S1210, each of the nodes may record the obtained remote attestation result value in a network snapshot message thereof using the Bloom filter.

After the performing of the self-remote attestation in operation S1210, each of the nodes receives a network snapshot message broadcast from at least one node that neighbors the at least one node, i.e., a neighboring node, and updates the network snapshot message using the received network snapshot message and a preset consensus protocol (S1220 and S1230).

Here, in operation S1230, each of the nodes may verify the integrity of each node, i.e., neighboring node, that broadcasts the network snapshot messages using the Schnorr multi-signature consensus protocol, and update the network snapshot message using a network snapshot message received from a neighboring node with verified integrity. The updating of the network snapshot message may include updating the network snapshot message by combining a remote attestation result value included in the network snapshot message with a remote attestation result value included in the received network snapshot message through the bitwise OR operation.

Here, the verifying of the integrity of each of the neighboring nodes may include the nodes starting the generation of tokens by generating commitment values, generating the tokens by integrating identifiers and commitment values corresponding to neighboring nodes of each of the nodes, and using the tokens to verify the integrity of the nodes that participate in the generation of the tokens. The verifying of the integrity of the nodes participating in the generation of the tokens may include nodes that participate in the generation of a token among the tokens storing signature values corresponding to the nodes in the token, integrating signature values corresponding to the nodes, and verifying the nodes participating in the generation of the tokens by verifying the integrated commitment values and the integrated signature values.

By repeatedly performing operations S1220 and S1230, when each of the nodes converges on a final network snapshot message, the remote attestation of the nodes constituting the network is monitored on the basis of a remote attestation result value updated in the network message (S1240).

It will be obvious to those of ordinary skill in the art that the above description of FIGS. 2 to 11 may apply to the remote attestation method of FIG. 12 even though the above description is omitted in the description of FIG. 12.

As described above, methods according to embodiments of the present disclosure are applicable to atypical networks for which routing is not necessary because a spanning tree need not be built, in which remote attestation may be performed considering mobility sufficiently because a device (prover) need not always be online or need not be connected to during remote attestation.

In addition, in methods according to embodiments of the present disclosure, a state of a network may be estimated using the Bloom filter and a consensus protocol instead of accurate information about a device state (node state), thereby reducing runtime performance, the number of devices to join or leave the network may be expanded, and each node may reach the convergence on a network state snapshot through collection of remote attestation certificates.

Figure 13:
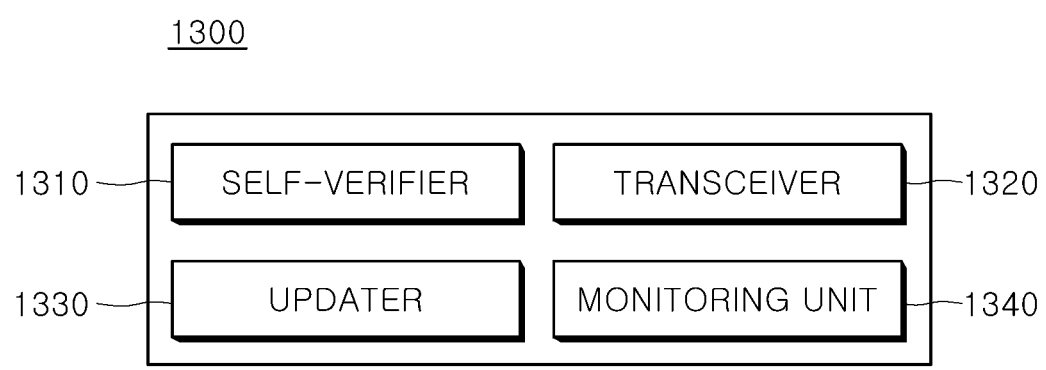
FIG. 13 is a diagram illustrating a configuration of an apparatus for performing remote attestation by taking into account mobility according to still another embodiment of the present disclosure.

FIG. 13 is a diagram illustrating a configuration of a remote attestation apparatus that performs remote attestation by taking into account mobility according to still another embodiment of the present disclosure, in which a conceptual configuration of each node performing the method of FIG. 12 is shown.

Referring to FIG. 13, the remote attestation apparatus 1300 for performing remote attestation by taking into account mobility according to still another embodiment of the present disclosure includes a self-verifier 1310, a transceiver 1320, an updater 1330, and a monitoring unit 1340.

The self-verifier 1310 performs self-remote attestation to obtain a remote attestation result value, and records the obtained remote attestation result value in a network message thereof.

In this case, the self-verifier 130 may record the obtained remote attestation result value in a network snapshot message thereof using the Bloom filter.

The transceiver 1320 broadcasts the network snapshot message to at least one node that neighbors it, i.e., at least one neighboring node, and receives a network snapshot message broadcast from the at least one neighboring node.

The updater 1330 updates the network snapshot message using the received network snapshot message and a preset consensus protocol.

In this case, the updater 1330 may verify the integrity of each of the at least one neighboring node broadcasting the network snapshot message using the Schnorr multi-signature consensus protocol, and update the network snapshot message using a network snapshot message received from a neighboring node whose integrity is verified.

Furthermore, the updater 1330 may start the generation of tokens by generating commitment values of the nodes, generate the tokens by integrating identifiers and commitment values corresponding to each neighboring node of the nodes, store signature values corresponding to nodes participating in the generation of a token among the tokens in the token, integrate the signature values corresponding to the nodes, and verify the integrated commitment values and the integrated signature values to verify the integrate of the nodes participating in the generation of the tokens.

When a network snapshot message of the monitoring unit 1340 converges on a final network snapshot message, the monitoring unit 1340 monitors remote attestation of each node constituting the network on the basis of a remote attestation result value updated in the network message.

Figure 14:
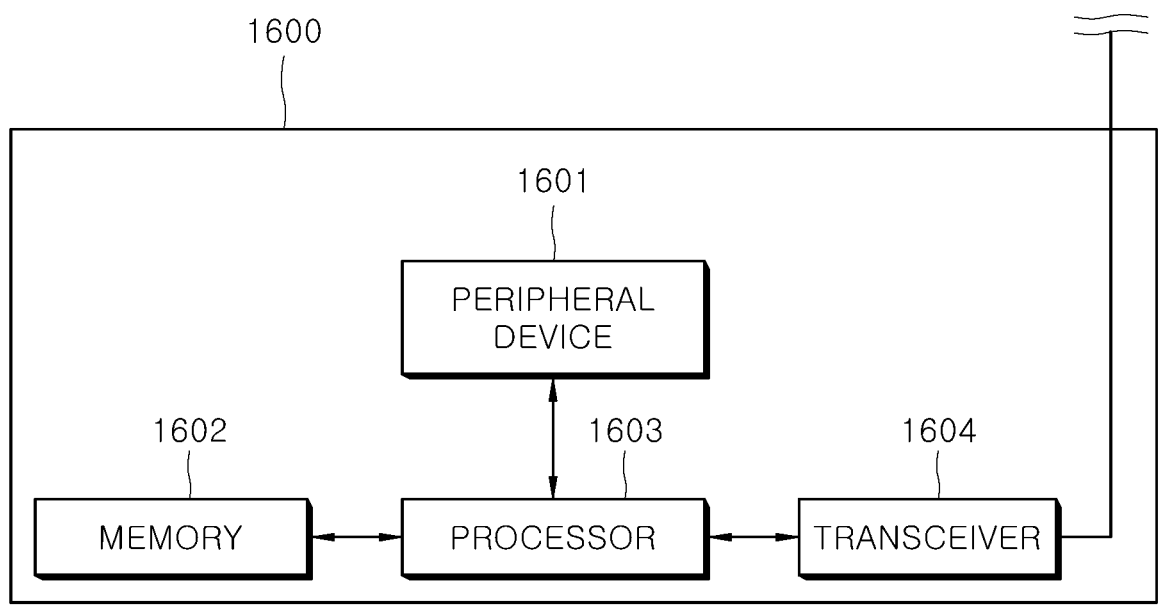
FIG. 14 is a diagram illustrating a configuration of a device to which an apparatus for performing remote attestation by taking into account mobility according to an embodiment of the present disclosure is applied.

FIG. 14 is a diagram illustrating a configuration of a device to which a remote attestation apparatus that performs remote attestation by taking into account mobility according to an embodiment of the present disclosure is applied.

For example, the remote attestation apparatus of FIG. 13 that performs remote attestation by taking into account mobility according to the embodiment of the present disclosure may correspond to a device 1600 of FIG. 14. Referring to FIG. 14, the device 1600 may include a memory 1602, a processor 1603, a transceiver 1604, and a peripheral device 1601. For example, the device 1600 may further include other components and is not limited to the above-described embodiment. In this case, the device 1600 may be, for example, a movable user terminal (e.g., a smart phone, a laptop computer, a wearable device, or the like) or a fixed management device (e.g., a server, a personal computer (PC), or the like).

More specifically, the device 1600 of FIG. 14 may be, for example, a hardware/software architecture such as a wavelength division multiplex (WDM) optical communication system, a sensing system, or a device. In this case, for example, the memory 1602 may be a non-removable memory or a removable memory. For example, the peripheral device 1601 may include, but is not limited to, a display, a Global Positioning System (GPS), or other peripheral devices.

For example, the device 1600 described above may include a communication circuit, such as the transceiver 1604, and communicate with an external device on the basis of the communication circuit.

For example, the processor 1603 may include at least one among a general-purpose processor, a digital signal processor (DSP), a DSP core, a controller, a microcontroller, application-specific integrated circuits (ASICs), field programmable gate array (FPGA) circuits, a different type of integrated circuit (IC), and one or more microprocessors related to a state machine. That is, the processor 1603 may be a hardware/software component that performs a control function for control of the device 1600 described above. In addition, the processor 1603 may modularize and perform functions of the self-verifier 1310, the updater 1330, and the monitoring unit 1340 of FIG. 13.

In this case, the processor 1603 may execute computer-executable instructions stored in the memory 1602 to perform various essential functions of the remote attestation device for performing remote attestation by taking into account mobility. For example, the processor 1603 may control at least one among signal coding, data processing, power control, input/output processing, or a communication operation. In addition, the processor 1603 may control a physical layer, a media access control (MAC) layer, and application layers. Furthermore, for example, the processor 1603 may perform authentication and security procedures at an access layer and/or the application layers, and is not limited to the above-described embodiment.

For example, the processor 1603 may communicate with other devices through the transceiver 1604. For example, the processor 1603 may execute computer-executable instructions to control a remote attestation apparatus, which performs remote attestation by taking into account mobility, to communicate with other devices through a network. That is, communication performed in the present disclosure may be controlled. For example, the transceiver 1604 may transmit a radio-frequency (RF) signal through an antenna and transmit a signal on the basis of various types of communication networks.

For example, multi-input multi-output (MIMO) technology, beamforming, or the like may be applied as antenna technology, but the present disclosure is not limited to the above-described embodiments. A signal transmitted or received through the transceiver 1604 may be modulated or demodulated, and controlled by the processor 1603, but the present disclosure is not limited to the above-described embodiments.

Although for clarity, example methods of the present disclosure are described as a series of operations, it is not intended to limit an order in which the operations are performed and the operations may be performed simultaneously or in a different order when necessary. To implement methods according to the present disclosure, additional operations may be added to operations provided as an example, some of the operations may be omitted and the rest included, or some of the operations may be omitted and additional operations may be added.

Various embodiments of the present disclosure are intended to describe example aspects of the present disclosure rather than listing all possible combinations, and matters described in various embodiments may be applied independently or in a combination of two or more thereof.

In addition, various embodiments of the present disclosure may be implemented by hardware, firmware, software, or a combination thereof. In the case of implementation by hardware, various embodiments of the present disclosure may be implemented by at least one of ASICs, DSPs, digital signal processing devices (DSPDs), programmable logic devices (PLDs), FPGAs, a general-purpose processor, a controller, a microcontroller, a microprocessor, or the like.

The scope of the present disclosure includes software- or machine-executable instructions (e.g., an operating system, an application, firmware, a program, etc.) that cause operations of methods according to various embodiments to be performed by a device or a computer, and a non-transitory computer-readable medium storing such software or instructions to be executed by a device or a computer.

According to the present disclosure, an apparatus and method for performing remote attestation by taking into account mobility are provided.

Effects of the present disclosure are not limited thereto, and other effects that are not described herein will be clearly understood by those of ordinary skill in the art to which the present disclosure pertains from the above detailed description.

What is claimed is:
1. A remote attestation method performed by taking into account mobility, comprising:

obtaining, by each node constituting a network, a remote attestation result value by performing self-remote attestation;

obtaining, by each of the nodes, remote attestation result values from other nodes by broadcasting the obtained remote attestation result value to at least one neighboring node; and monitoring, by each of the nodes, remote attestation of each of the nodes based on the obtained remote attestation result values of the nodes, wherein in a snapshot state representing a final network state in which remote attestation result values from other nodes are obtained, each of the nodes updates its own network snapshot message using network snapshot messages of nodes whose integrity has been verified, wherein the obtaining of the remote attestation result value by performing the self-remote attestation comprises recording the remote attestation result value of each of the nodes in a predetermined network message using a Bloom filter.

2. The remote attestation method of claim 1, wherein the obtaining of the remote attestation result values from the other nodes comprises obtaining remote attestation result values of the other nodes by broadcasting the network message to the at least one neighboring node and updating the network message using a preset consensus protocol and a network message received from the at least one neighboring node.

3. The remote attestation method of claim 2, wherein the obtaining of the remote attestation result values from the other nodes comprises updating, by each of the nodes, the network message by combining a remote attestation result value recorded in the network message with a remote attestation result value recorded in the received network message.

4. The remote attestation method of claim 2, wherein the consensus protocol comprises a symmetric key-based consensus protocol or an asymmetric key-based consensus protocol.

5. The remote attestation method of claim 2, wherein the obtaining of the remote attestation result values from the other nodes comprises: verifying, by each of the nodes, integrity of each of the nodes using the consensus protocol; updating the network message with a network message of at least one node with verified integrity; and obtaining remote attestation result values of the other nodes through the updated network message.

6. The remote attestation method of claim 5, wherein the verifying of the integrity of each of the nodes comprises: starting, by the nodes, generation of tokens by generating commitment values; generating the tokens by integrating identifiers and commitment values corresponding to neighboring nodes of the nodes; and verifying integrity of the nodes participating in the generation of the tokens using the tokens.

7. The remote attestation method of claim 6, wherein the verifying of the integrity of the nodes participating in the generation of the tokens comprises: storing, by nodes participating in the generation of a token among the tokens, signature values corresponding to the nodes in the token; integrating the signature values corresponding to the nodes; and verifying integrity of the nodes participating in the generation of the tokens by verifying integrated commitment values and the integrated signature values.

8. The remote attestation method of claim 7, wherein the commitment values ($R_i$) are generated to correspond to $R_i = g^{\{r_i\}}$ with respect to a group G with a prime order q, a generator g of the group G, and a secret random number $r_i$.

9. The remote attestation method of claim 8, wherein the signature values (Si) are generated to correspond to $s_i=r_i+cx_i$ with respect to a signature private key $x_i$ among pairs of signature keys, the secret random number $r_i$, and a hash value c, and wherein the hash value c is generated to correspond to the integrated commitment values and a message requesting an electronic signature.

10. The remote attestation method of claim 9, wherein the verifying of the integrated commitment values and the integrated signature values comprises using a common public key obtained by integrating signature public keys among the pairs of signature keys.

11. A remote attestation method performed by taking into account mobility, comprising:
performing, by each node constituting a network, self-remote attestation to obtain a remote attestation result value and recording the obtained remote attestation result value in a network message of the node; receiving, by each of the nodes, a network message broadcast from at least one neighboring node; updating by each of the nodes the network message using the received network message and a preset consensus protocol; and monitoring, by each of the nodes, remote attestation of the nodes constituting the network based on a remote attestation result value updated in the network message, wherein in a snapshot state representing a final network state in which remote attestation result values from other nodes are obtained, each of the nodes updates its own network snapshot message using network snapshot messages of nodes whose integrity has been verified, wherein the recording of the obtained remote attestation result value in the network message comprises recording the obtained remote attestation result value in the network message using a Bloom filter.

12. The remote attestation method of claim 11, wherein the updating of the network message comprises: verifying integrity of each of the nodes using the consensus protocol; and updating the network message with a network message of a node with verified integrity.

13. The remote attestation method of claim 12, wherein the verifying of the integrity of each of the nodes comprises: starting, by the nodes, generation of tokens by generating commitment values; generating the tokens by integrating identifiers and commitment values corresponding to neighboring nodes of the nodes; and verifying integrity of the nodes participating in the generation of the tokens using the tokens.

14. The remote attestation method of claim 13, wherein the verifying of the integrity of the nodes participating in the generation of the tokens comprises: storing, by nodes participating in the generation of a token among the tokens, signature values corresponding to the nodes in the token; integrating the signature values corresponding to the nodes; and verifying integrity of the nodes participating in the generation of the tokens by verifying integrated commitment values and the integrated signature values.

15. A remote attestation apparatus for performing remote attestation by taking into account mobility, comprising: a processor configured to perform self-remote attestation to obtain a remote attestation result value and record the obtained remote attestation result value in a network message of the self-verifier; and a receiver configured to receive a network message broadcast from at least one neighboring node, wherein the processor is further configured to update the network message using the received network message and a preset consensus protocol and to monitor remote attestation of nodes constituting a network based on a remote attestation result value updated in the network message, wherein in a snapshot state representing a final network state in which remote attestation result values from other nodes are obtained, each of the nodes updates its own network snapshot message using network snapshot messages of nodes whose integrity has been verified, wherein the processor records the obtained remote attestation result value in the network message using a Bloom filter.

16. The remote attestation apparatus of claim 15, wherein the processor verifies integrity of each of the nodes using the consensus protocol and updates the network message with a network message of a node with verified integrity.

17. The remote attestation apparatus of claim 16, wherein the processor is further configured to: start generation of tokens by generating commitment values of the nodes; generate the tokens by integrating identifiers and commitment values corresponding to neighboring nodes of the nodes; store signature values corresponding to nodes participating in the generation of a token among the tokens in the token; integrate the signature values corresponding to the nodes; and verify integrity of the nodes participating in the generation of the tokens by verifying the integrated commitment values and the integrated signature values.

* * * * *